United States Patent [19]
Saito

[11] Patent Number: 4,755,895
[45] Date of Patent: Jul. 5, 1988

[54] LOADING DEVICE FOR POSITIONING A DISC CASSETTE ON A RECORDING AND/OR REPRODUCING APPARATUS

[75] Inventor: Etsuro Saito, Ayase, Japan

[73] Assignee: Sony Corporation, Tokyo, Japan

[21] Appl. No.: 837,032

[22] Filed: Mar. 6, 1986

Related U.S. Application Data

[63] Continuation of Ser. No. 515,188, Jul. 19, 1983, Pat. No. 4,614,990.

[30] Foreign Application Priority Data

Jul. 19, 1982 [JP] Japan .................... 57-125376
Jul. 21, 1982 [JP] Japan .................... 57-125888

[51] Int. Cl.⁴ .................... G11B 5/016; G11B 5/012
[52] U.S. Cl. .................... 360/97; 360/99; 360/133; 369/270
[58] Field of Search .................... 360/97–99, 360/133, 86; 369/270, 77.1, 261

[56] References Cited

U.S. PATENT DOCUMENTS

| | | | |
|---|---|---|---|
| 4,120,012 | 10/1978 | Bowers | 360/133 |
| 4,131,199 | 12/1978 | Hatchett et al. | 360/133 |
| 4,239,238 | 12/1980 | Coleman | 360/97 |
| 4,320,430 | 3/1982 | Vogt | 360/133 |
| 4,358,801 | 11/1982 | Faber et al. | 360/97 |
| 4,400,748 | 8/1983 | Bauck et al. | 360/99 |
| 4,445,155 | 4/1984 | Takahashi et al. | 360/99 |
| 4,466,032 | 8/1984 | Saito | 360/99 X |
| 4,488,190 | 12/1984 | Oishi et al. | 360/97 |
| 4,503,474 | 3/1985 | Nigum | 360/133 |
| 4,510,546 | 4/1985 | Osami et al. | 360/133 |
| 4,511,944 | 4/1985 | Saito | 300/133 |
| 4,614,990 | 9/1986 | Saito | 360/133 X |

FOREIGN PATENT DOCUMENTS

| | | | |
|---|---|---|---|
| 55-42311 | 3/1980 | Japan | 360/133 |
| 58-57685 | 4/1983 | Japan | 360/133 |
| 58-97166 | 6/1983 | Japan | 360/133 |
| 58-153279 | 9/1983 | Japan | 360/133 |
| 59-3741 | 1/1984 | Japan | 360/99 |
| 2110462 | 6/1983 | United Kingdom | 360/133 |

OTHER PUBLICATIONS

IBM Technical Disclosure Bulletin, vol. 27, No. 1A, Jun. 1984, pp. 40–41, by Carey et al., "Shutter Mechanism . . . ".

Primary Examiner—John H. Wolff
Assistant Examiner—Alfonso Garcia
Attorney, Agent, or Firm—Alvin Sinderbrand

[57] ABSTRACT

In a recording and/or reproducing apparatus for use with a disc cassette including a jacket containing a record disc and having a window through which the disc may be exposed, a shutter movable on the jacket between opened and closed positions in respect to the window and a latch for locking the shutter in its closed position, there is provided a loading device for positioning the disc cassette and which comprises a cassette holder having opposite side portions slidably receiving the jacket for the insertion and removal of the latter to and from an operative position therein in which said record disc is engageable by a spindle and transducer on a chassis of the apparatus, a projection extending from one of the side portions of the cassette holder and being operative, in response to slidable insertion of the jacket into the cassette holder, to release the latch and to move the shutter to its opened position relative to said window, and a pawl at said one side portion of the cassette holder and being engageable with the shutter for positively moving the latter to its closed position in response to slidable removal of the jacket from the cassette holder.

21 Claims, 16 Drawing Sheets

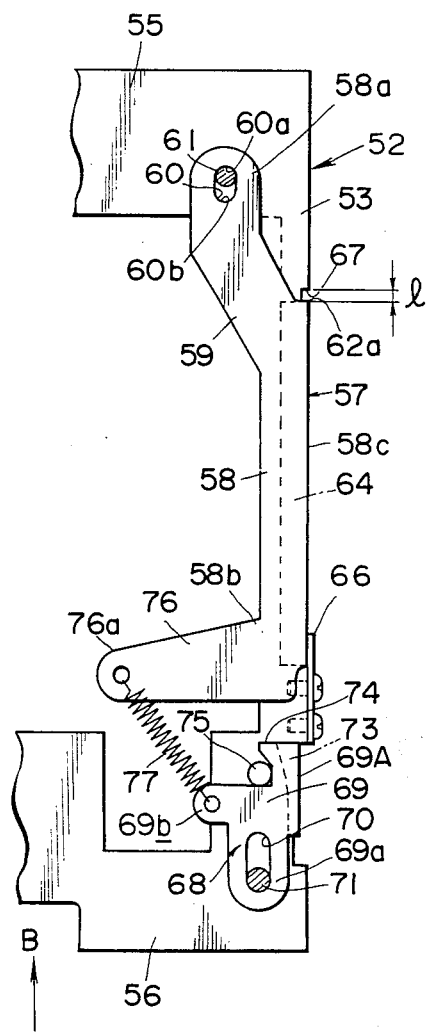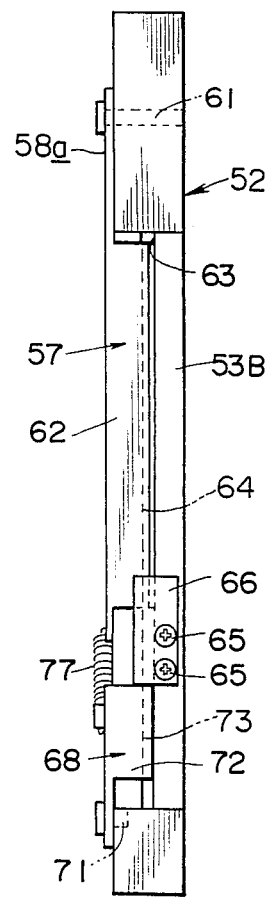

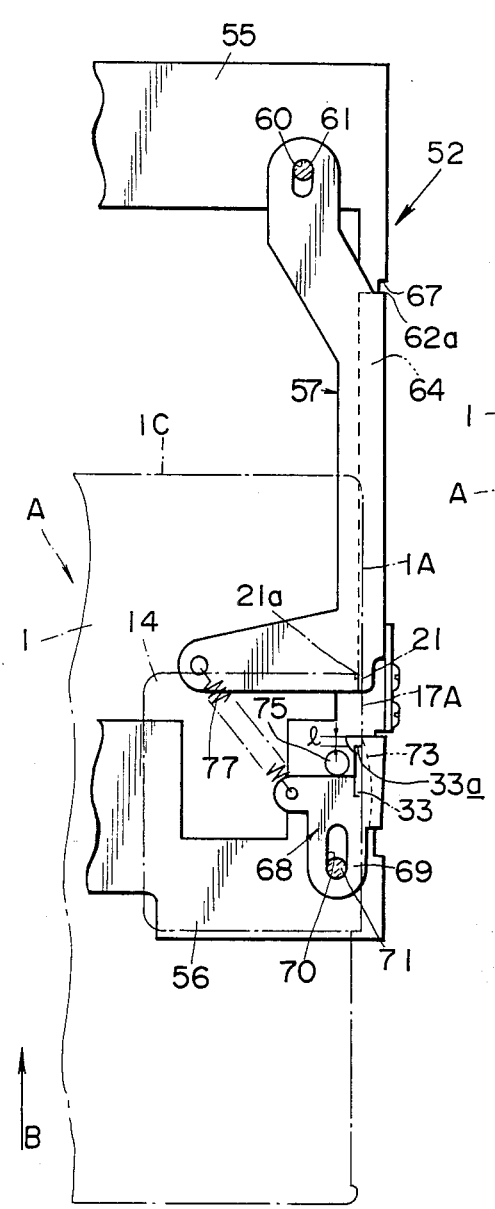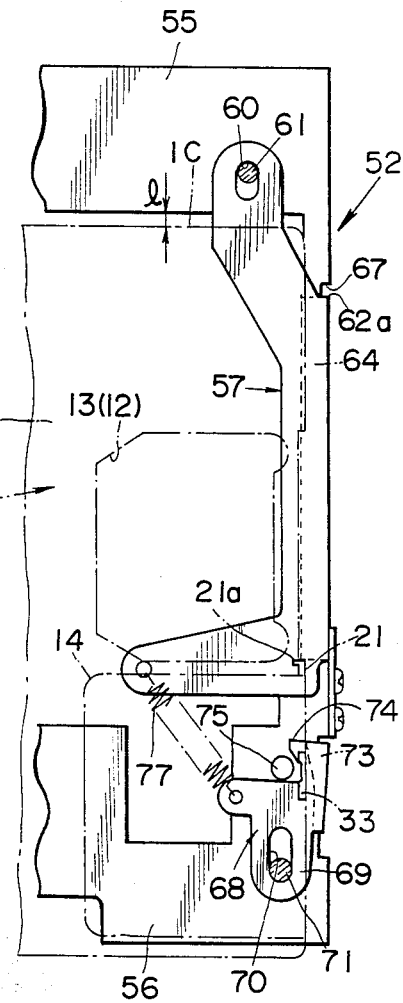

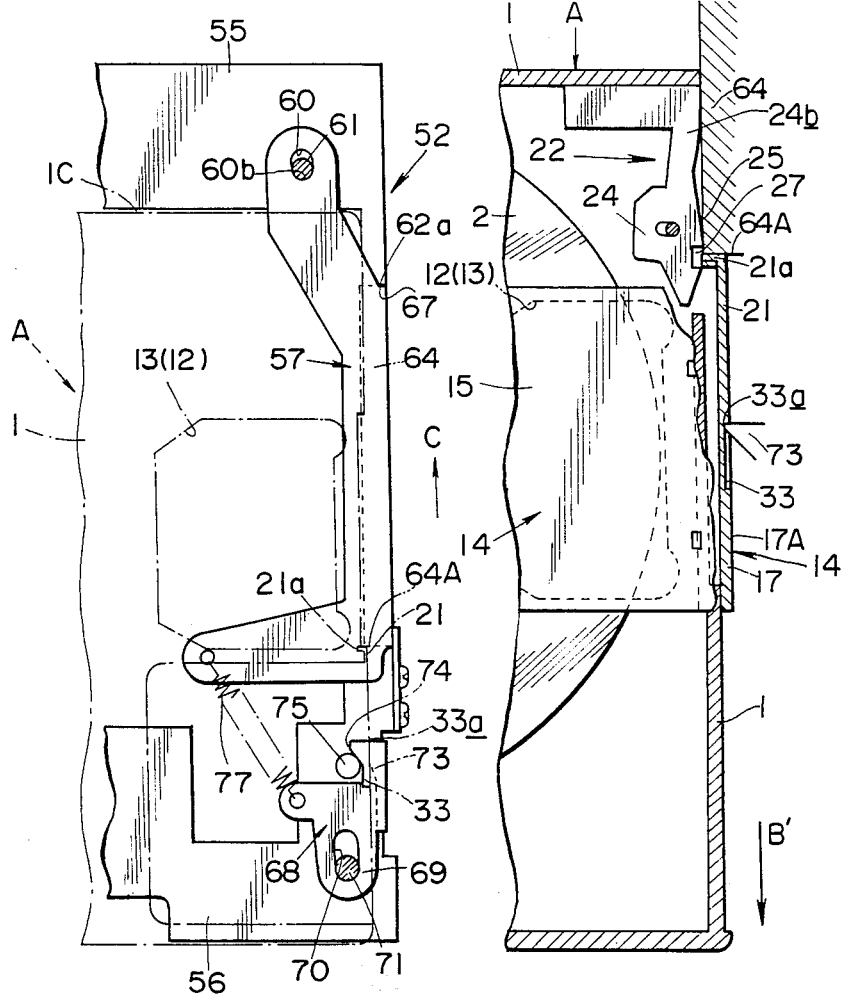

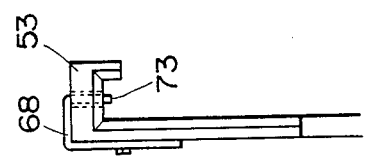
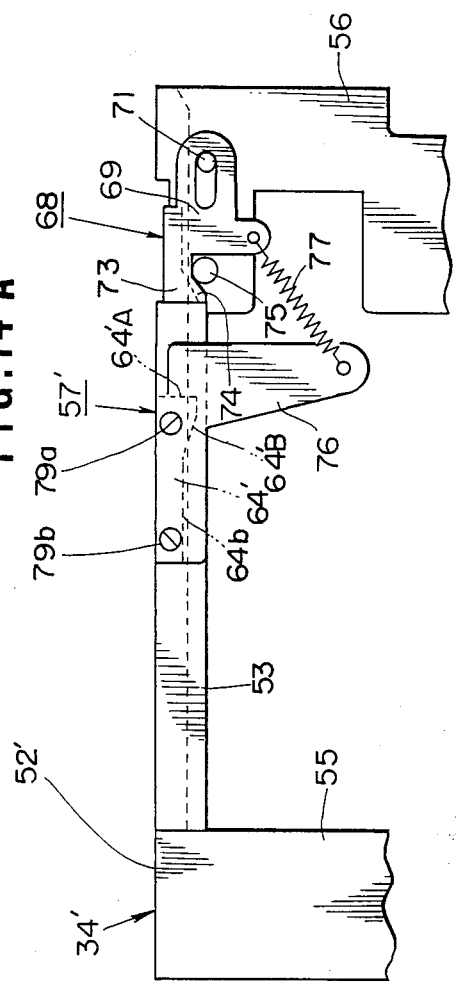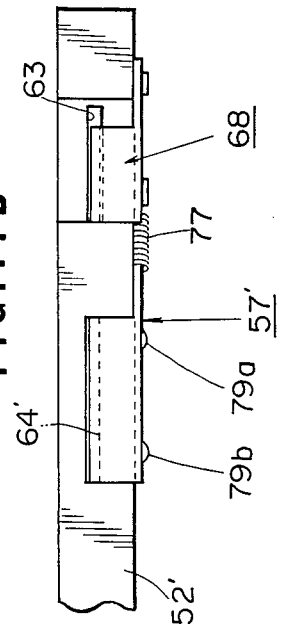

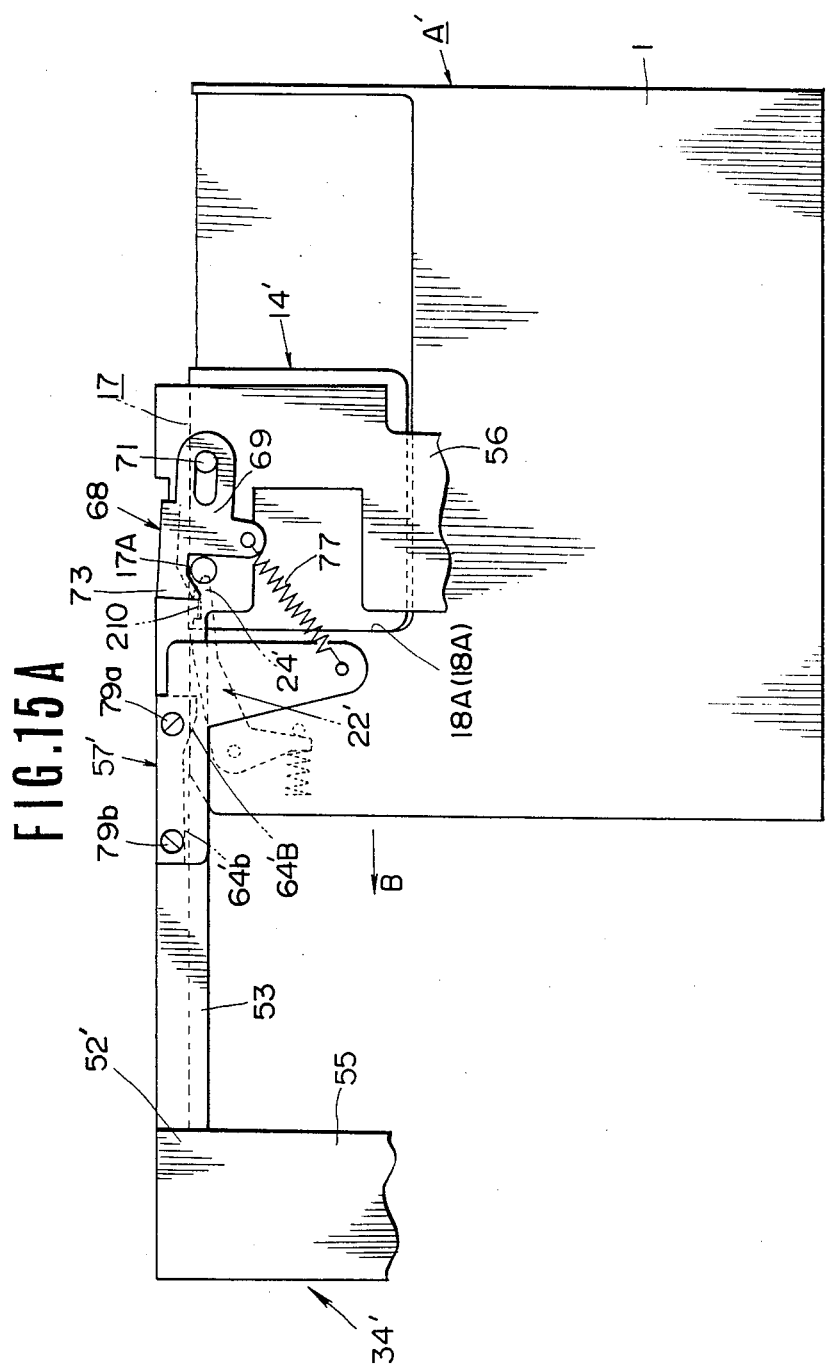

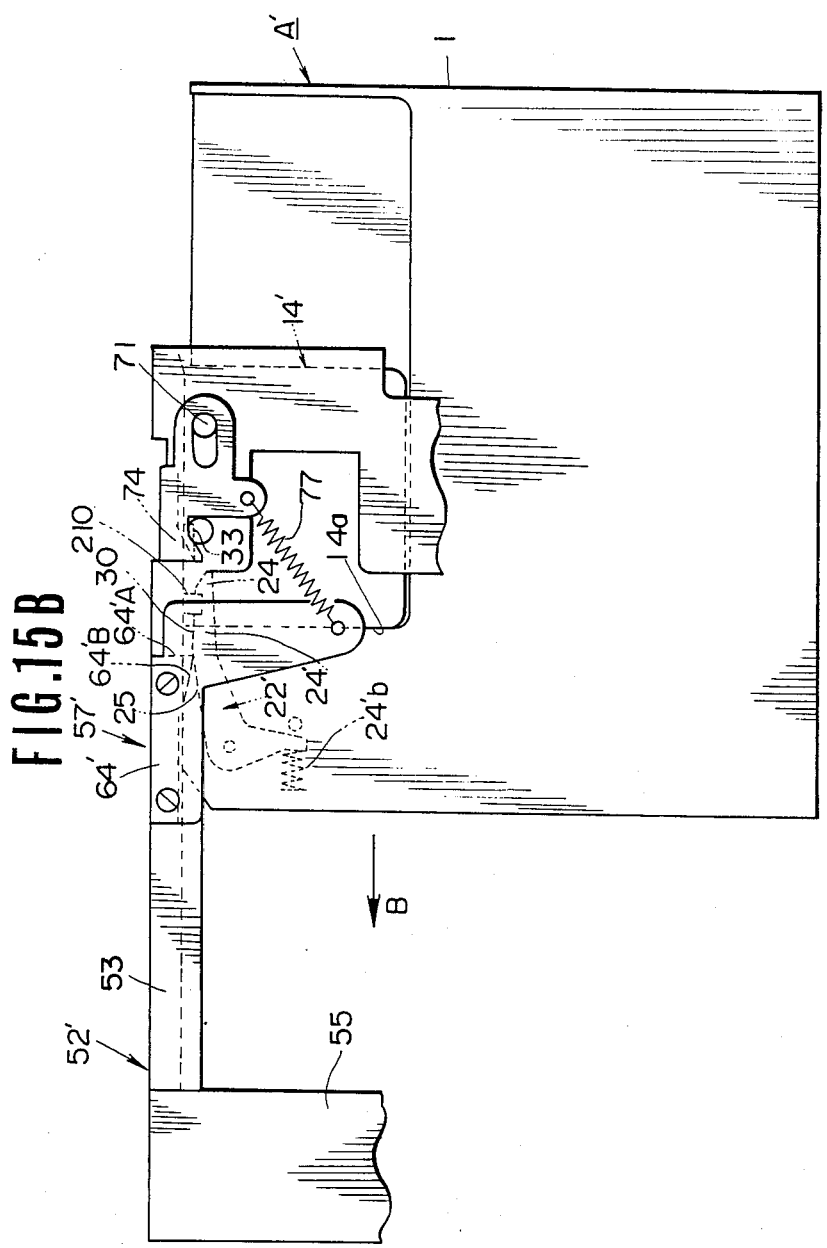

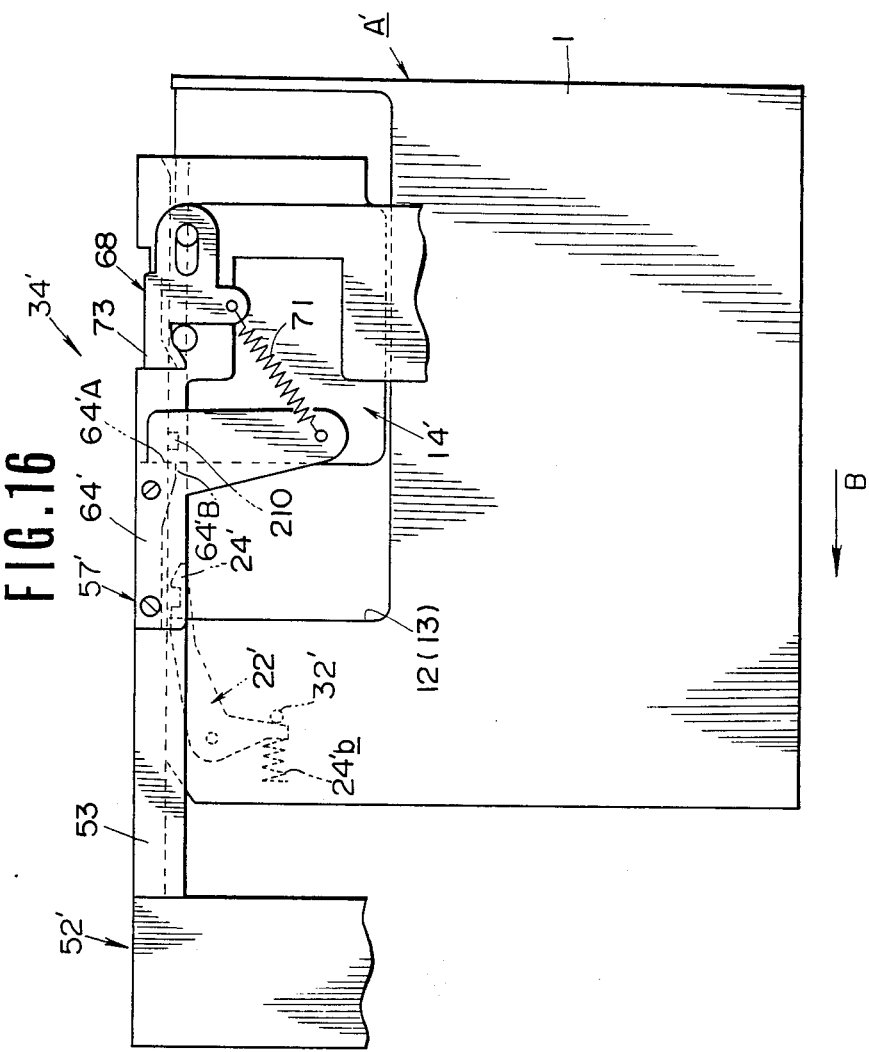

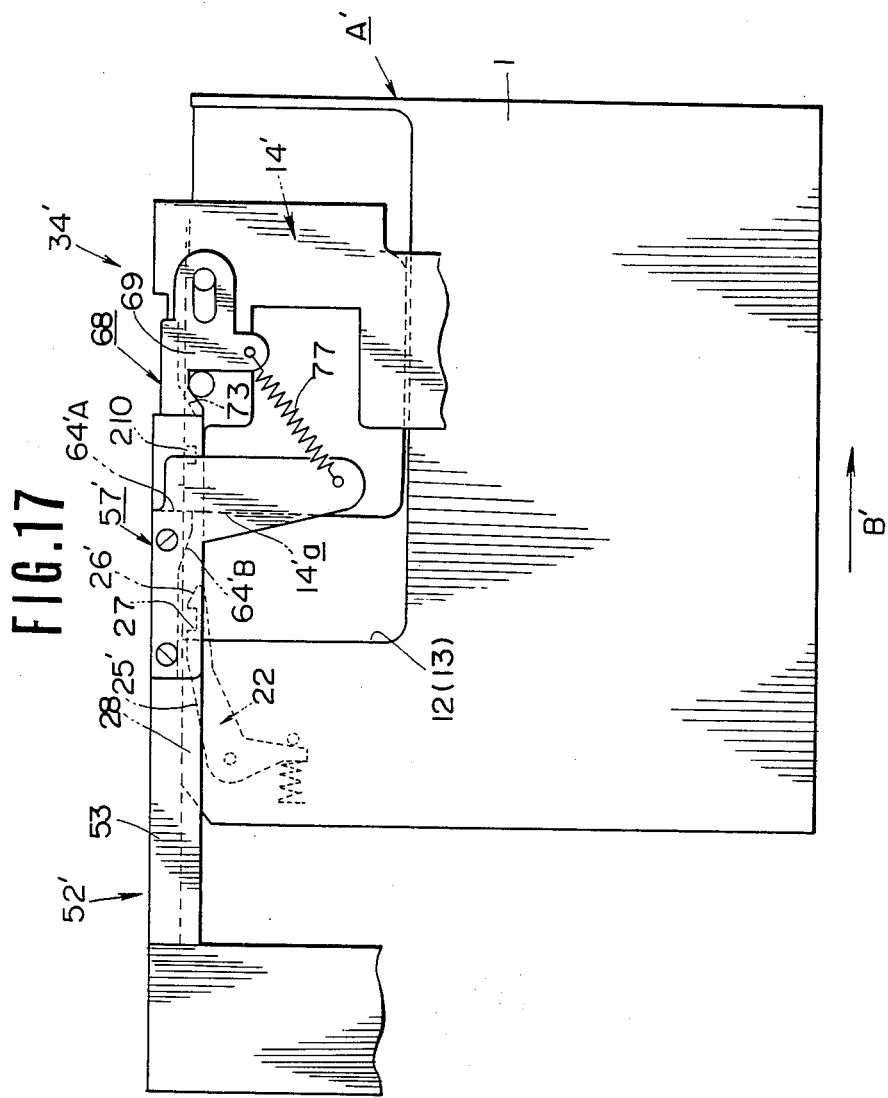

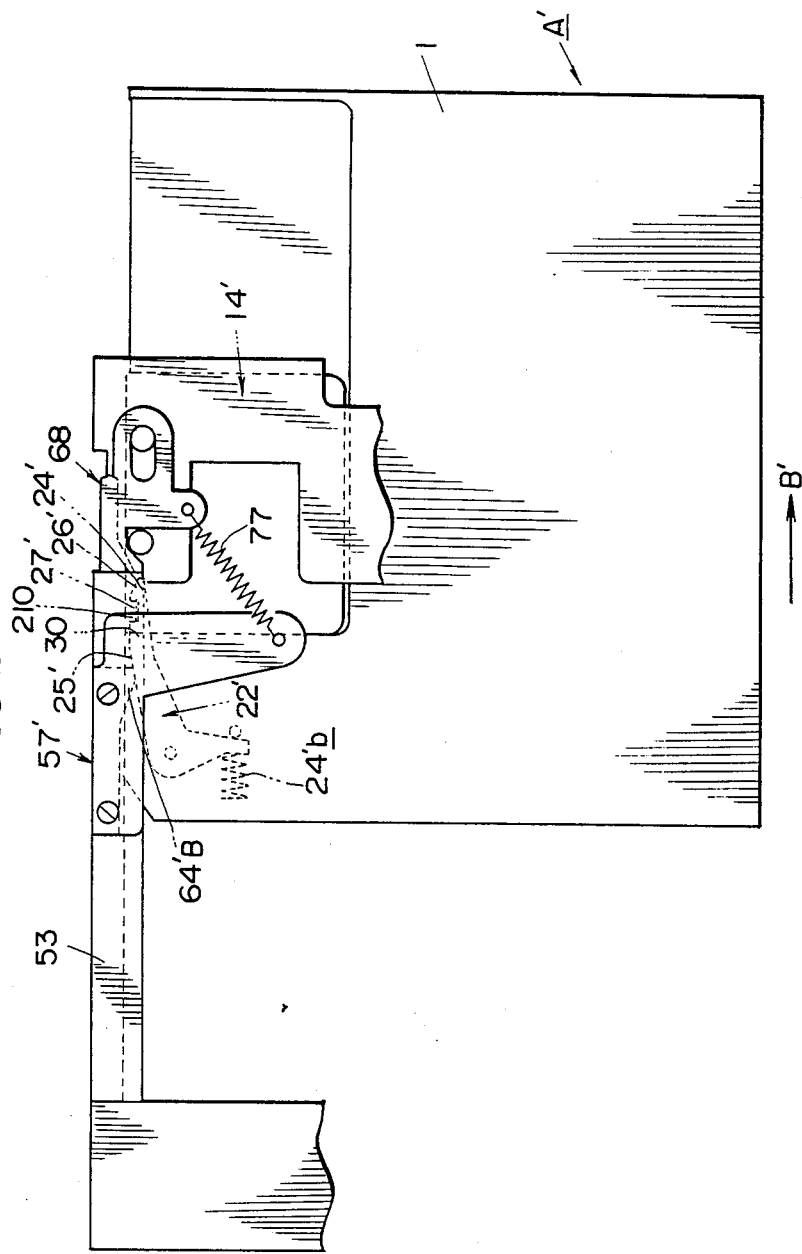

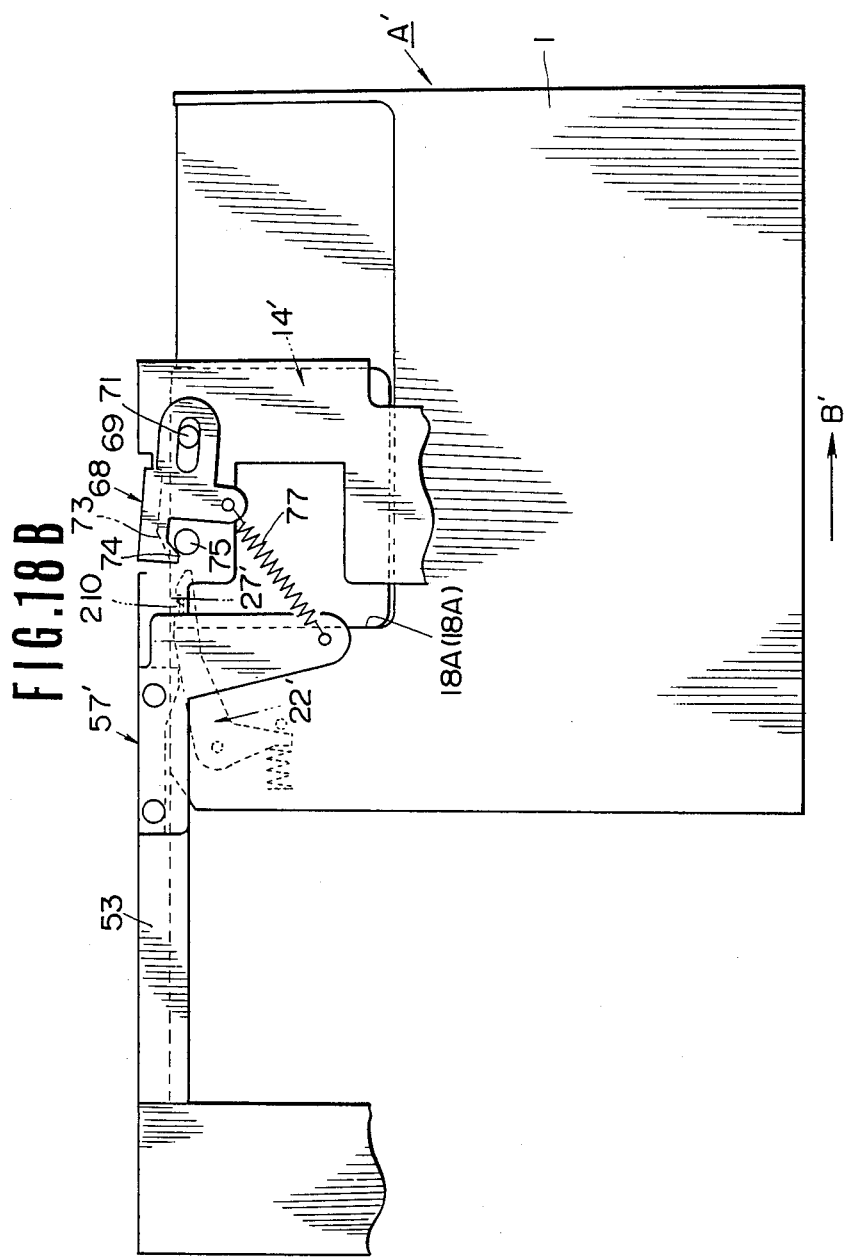

LOADING DEVICE FOR POSITIONING A DISC CASSETTE ON A RECORDING AND/OR REPRODUCING APPARATUS

This is a division of application Ser. No. 06/515,188, filed July 19, 1983 now U.S. Pat. No. 4,614,990.

BACKGROUND OF THE INVENTION

1. Field of the Invention

This invention relates to a disc cassette and to a loading device for positioning the disc cassette on a recording and/or reproducing apparatus.

2. Description of the Prior Art

It has been proposed, for example, in my copending U.S. patent application Ser. No. 06/383,208 filed May 28, 1982, and having a common assignee herewith, to provide a disc cassette or cartridge in which a so-called "floppy" disc or diskette is housed within a substantially flat jacket which protects the disc from crumpling, folding or other damage, particularly when the magnetic disc cassette is not in use or when it is being transported. In order to permit a magnetic transducer to gain access to the disc for recording or reproducing signals thereon without requiring the removal of the magnetic disc from the jacket, the jacket is provided with a window through which the transducer of a magnetic recording and/or reproducing apparatus can effect magnetic contact with a surface of the disc when the jacket is operatively positioned in the apparatus. In order to avoid the entry of dust or damaging contact with the magnetic disc through the window, the earilier proposed jacket is provided with a shutter movable between opened and closed positions in respect to the window. Usually, a spring is provided within the jacket for urging the shutter to its closed position, and the recording and/or reproducing apparatus intended for use with such disc cassette includes a cassette holder in which the jacket is slidable during its insertion and removal to and from an operative position, with a projection being provided in the cassette holder for moving the shutter to its opened position against the force of the spring acting thereon in response to the slidable insertion of the jacket to its operative position.

The earlier proposed disc cassette has also been provided with a latch within the jacket for holding the shutter in its closed position, and such latch is automatically released by the projection which thereafter acts on the shutter for moving the latter to its opened position in response to the insertion of the jacket to its operative position. On the other hand, when the jacket is slidably withdrawn or removed from the cassette holder, the spring acting on the shutter moves the latter to its closed position where it is again locked or secured by the latch.

However, it has been found that the assembling within the jacket of the spring for urging the shutter to its closed position is a troublesome and relatively costly operation, and further that the spring is prone to failure due to fatigue after repeated use of the cassette. If such spring does fail, or if the spring is omitted from the disc cassette assembly, the shutter is not automatically moved to its closed position in response to the withdrawl or removal of the jacket from the cassette holder. In that case, the shutter may remain open after removal of the jacket from the holder, thereby giving rise to the possibility of damage to the magnetic disc through the opened window. Further, it is troublesome to close the shutter by manual operation thereof after removal of the jacket from the cassette holder.

OBJECTS AND SUMMARY OF THE INVENTION

Accordingly, it is an object of this invention to provide a disc cassette and a loading device for positioning the same on a recording and/or reproducing apparatus which avoid the previously mentioned disadvantages of the prior art.

More specifically, it is an object of this invention to provide a disc cassette and a loading device therefor in which a shutter is normally held in a closed position in respect to a window of the jacket by means of a latch in the jacket, and the latch is released and the shutter is positively moved to its opened position in response to the insertion of the jacket to an operative position in a cassette holder, while the shutter is positively moved or returned to its closed position in response to the removal of the jacket from the cassette holder, and without the need to provide a spring in the jacket for urging the shutter to its closed position.

Another object of this invention, is to provide a disc cassette and a loading device therefor, as aforesaid, which are smooth and reliable in operation and relatively inexpensive to produce.

In accordance with an aspect of this invention, in a recording and/or reproducing apparatus, including a main chassis having a rotary spindle and a signal transducer mounted thereon and being intended for use with a disc cassette including a jacket containing a record disc and having a window through which the disc may be exposed, a shutter movable on the jacket between opened and closed positions in respect to the window and a latch for locking the shutter in its closed position, a loading device for positioning the disc cassette on the recording and/or reproducing apparatus comprises a cassette holder mounted on the main chassis and having opposite side portions slidably receiving the jacket for insertion and removal of the latter to and from an operative position therein in which the record disc is engageable by the spindle and transducer; a projection extending from one of the side portions of the cassette holder and being operative, in response to slidable insertion of the jacket into the cassette holder, to release the latch and to move the shutter to its opened position; and pawl means at the same side portion of the cassette holder as the projection and being engageable with the shutter for moving the latter to its closed position in response to slidable removal of the jacket from the cassette holder.

In a desirable embodiment of the invention, the pawl means includes a pawl member movably mounted on the cassette holder for movement between engaged and disengaged positions relative to the shutter on the jacket slidable in the cassette holder, a spring urging the pawl member to its engaged position, and release means operative to move the pawl member to its disengaged position in response to further removal of the jacket from the cassette holder after the shutter has been moved to its closed position.

The above, and other objects, features and advantages of the invention, will be apparent in the following detailed description of illustrative embodiments thereof which is to be read in connection with the accompanying drawings in which corresponding parts are identified by the same reference numerals in the several views of the drawings.

BRIEF DESCRIPTION OF THE DRAWINGS

FIG. 6 is an enlarged plan view of one side portion of the cassette holder of FIG. 5;

FIG. 7 is a side elevational view of the cassette holder of FIGS. 5 and 6;

FIG. 8 is a view similar to that of FIG. 6, but showing the cassette holder at a time when the jacket of the disc cassette has been inserted approximately halfway into the holder;

FIGS. 10 and 11 are additional views similar to that of FIG. 8, but showing the cassette holder in the state thereof when the jacket has been inserted sufficiently to move the shutter to its opened position, and in the state thereof when the jacket has been fully inserted into the cassette holder, respectively;

FIG. 12 is a diagrammatic sectional view illustrating the manner in which the shutter is positively returned to its closed position in response to the removal of the jacket from the cassette holder;

FIGS. 14A, 14B and 14C are respectively a plan view of a side portion of a cassette holder for use with the disc cassette of FIGS. 13A and 13B, a side elevational view and an end elevational view of such cassette holder; and FIGS. 15A, 15B, 16, 17, 18A and 18B are diagrammatic plan views illustrating successive stages in the operation of the loading device of FIGS. 14A–14C upon the insertion and removal of the disc cassette of FIGS. 13A and 13B.

DETAILED DESCRIPTION OF THE PREFERRED EMBODIMENTS

Figure 1:
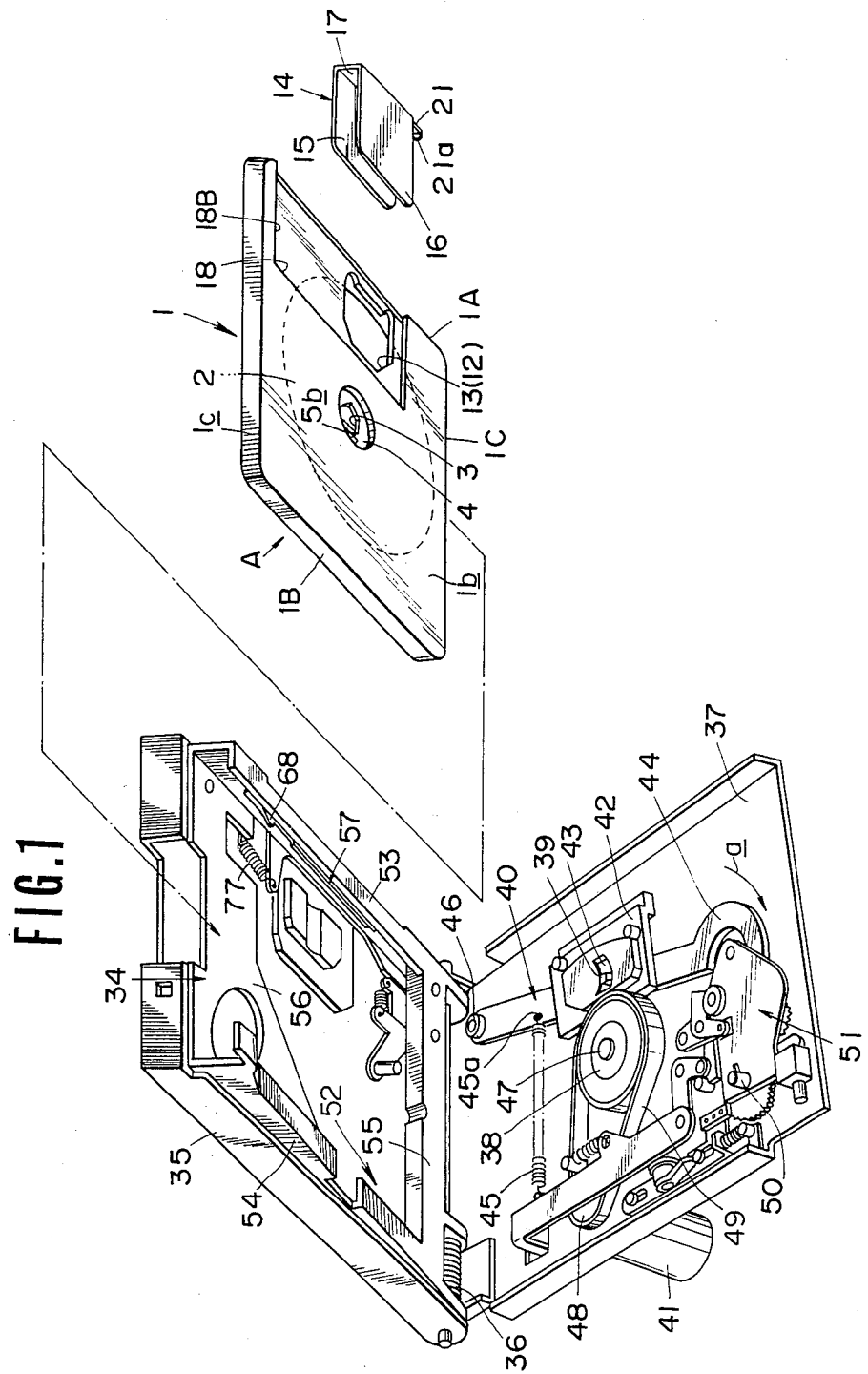
FIG. 1 is a perspective view of a recording and/or reproducing apparatus having a loading device in accordance with an embodiment of this invention, and also showing a disc cassette intended for use in such apparatus, but which is shown with its shutter disassembled from the jacket of the cassette for exposing a portion of the interior thereof.
Figure 2:
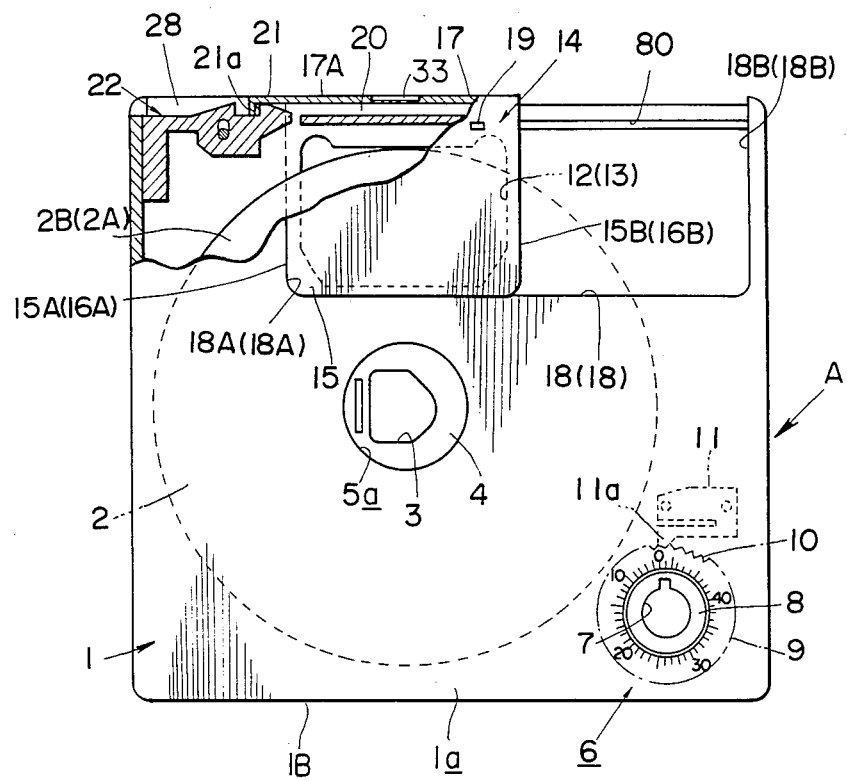
FIG. 2 is an enlarged plan view of a disc cassette according to an embodiment of the invention with its jacket and shutter being partly broken away and in section for illustrating internal details of the cassette.
Figure 3:
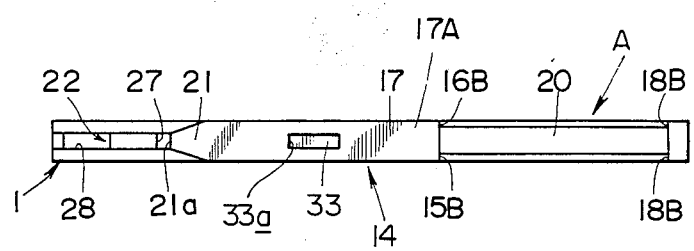
FIG. 3 is an elevational view of the disc cassette of FIG. 2 as viewed from the side thereof along which the shutter is movable.

Referring to the drawings in detail, and initially to FIGS. 1–3 thereof, it will be seen that a disc cassette A according to an embodiment of this invention generally comprises a jacket 1 which is of substantially flat, rectangular configuration and desirably formed of a suitable synthetic resin, and a magnetic sheet 2 in the form of a disc which is rotatably accommodated within the interior of jacket 1. More particularly, jacket 1 is shown to include relatively closely spaced apart panel walls 1a and 1b between which disc 2 is located, and a peripheral wall 1c extending between the perimeters of panel walls 1a and 1b. Disc 2 is rotatably guided between panel walls 1a and 1b of jacket 1 by means of a central hub 4 on the disc formed with a spindle or drive shaft reception hole 3 and being loosely rotatable in openings 5a and 5b provided at the centers of panel walls 1a and 1b, respectively.

The disc cassette A further preferably has an indicator 6 (FIG. 2) which forms no part of the present invention, but is desirably provided for indicating the number of annular magnetic tracks on disc 2 in which signals have been recorded. As shown, the indicator 6 may include a rotatable index member 8 having a keyhole-shaped opening 7 therein and being adapted to cooperate with a scale extending around a circular opening provided in a corner portion of panel wall 1a for receiving rotatable index member 8. A detent member 11 is secured within jacket 1 adjacent a flange 9 on index member 8 and has a tooth member 11a resiliently engaging a serrated periphery 10 on flange 9 so that index member 8 is yieldably retained in any position to which it has been turned.

Panel walls 1a and 1b are respectively formed with registering openings or windows 12 and 13 adjacent one side 1A of jacket 1 for partially exposing the opposite surfaces of disc 2. A shutter 14, which may be formed of sheet metal, is movable on jacket 1 in a direction along side 1A of the latter between closed and opened positions in respect to openings or windows 12 and 13. The shutter 14 is desirably shown to include a pair of spaced parallel plates 15 and 16 of sufficient size to cover windows 12 and 13 and a connecting web or portion 17 extending between plates 15 and 16 to straddle size 1A of jacket 1 while plates 15 and 16 are slidably disposed against the adjacent outer surfaces of panel walls 1a and 1b. Preferably, such outer surfaces of panel walls 1a and 1b are formed with shallow recesses accommodating shutter plates 15 and 16 and defining the limits of the movements of the shutter 14 between its opened and closed positions. Bosses 19 (FIG. 2) are struck or otherwise extend inwardly from shutter plates 15 and 16 to slidably engage in respective grooves 80 extending along recesses 18 parallel to the side 1A, and thereby slidably assemble shutter 14 on jacket 1. The closed position of shutter 14 is shown on FIG. 2 to be defined by the engagement of end edges 15A and 16A of shutter plates 15 and 16 with shoulders 18A at one end of recesses 18. Similarly, the opened position of shutter 14 is defined by the engagement of the opposite end edges 15B and 16B of shutter plates 15 and 16 with shoulders 18B defined by the other end surfaces of recesses 18.

Figure 4:
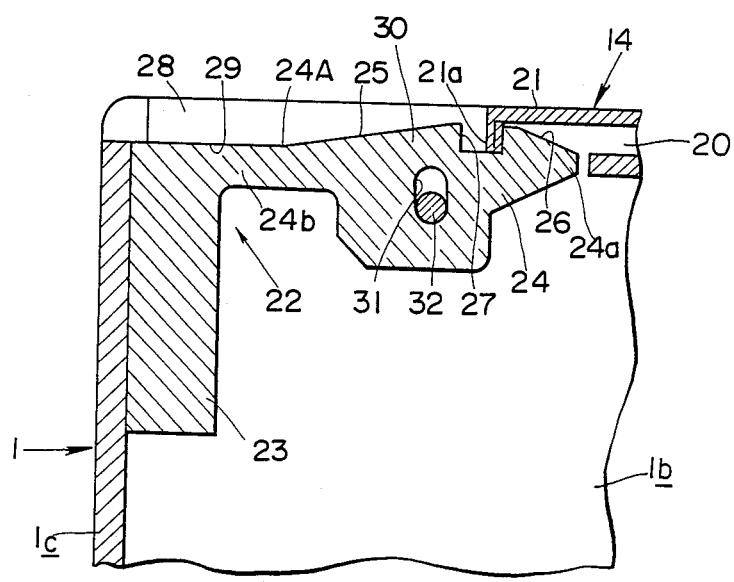
FIG. 4 is a further enlarged sectional view corresponding to a portion of FIG. 2, and showing details of the latch by which the shutter is releasably secured in its closed position.
Figure 5:
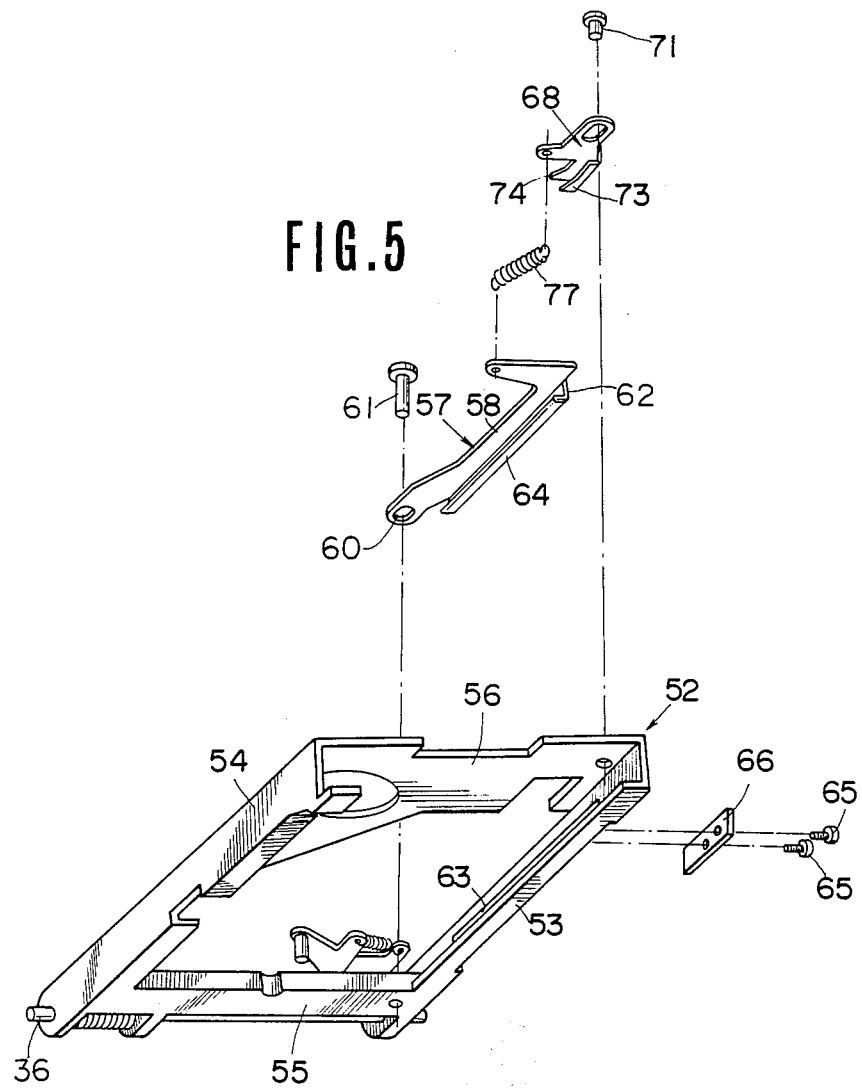
FIG. 5 is an exploded perspective view of a cassette holder which is included in the apparatus of FIG. 1.

The peripheral wall 1c of jacket 1 is interrupted adjacent one end portion of side 1A of the jacket to define a gap 28, and a groove 20 is formed along peripheral wall 1c extending from gap 28 for the remainder of side 1A. Thus, the connecting web portion 17 of shutter 14 is movable into groove 20 and is shown to have a projecting portion 21 at the end of connecting web 17 extending toward gap 28. Such projecting portion 21 has an inwardly bent end defining a keeper 21a dimensioned to extend inwardly into gap 28 and then along groove 20 when shutter 14 is moved from its closed position to its opened position. A latch 22 is provided within gap 28 of jacket 1 and is engageable with keeper 21a for releasably securing shutter 14 in its closed position as shown on FIGS. 2-4.

Figure 9:
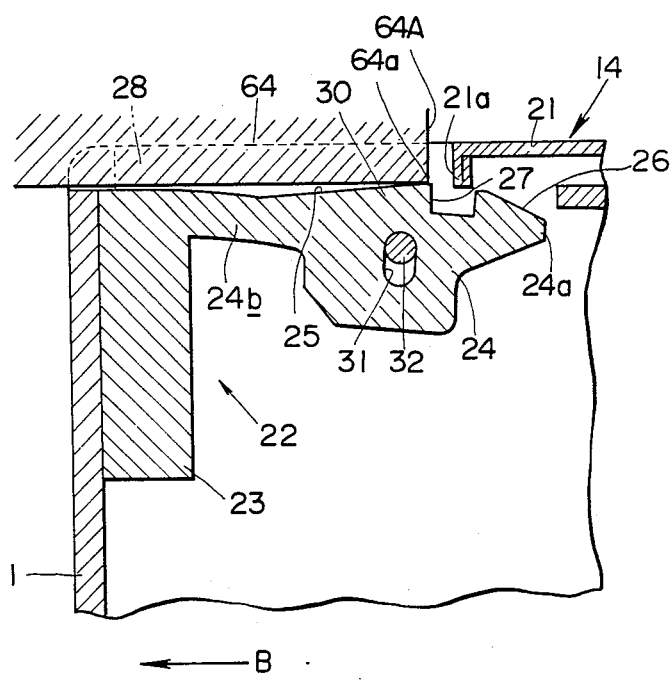
FIG. 9 is an enlarged sectional view similar to that of FIG. 4, but illustrating the release of the latch in response to the insertion of the jacket into the cassette holder.

Latch 22 is desirably formed of a synthetic resin which is resilient, at least in relatively thin portions thereof, and includes a base portion 23 suitably fixed to jacket 1, and a latching portion 24 having a free end 24a and being joined, at its other end, to base portion 23 by a relatively thin resiliently yieldable portion 24b. Thus, latching portion 24 is movable inwardly from a latching position shown in FIG. 4 to a released position shown in FIG. 9. The edge surface of latching portion 24 which is directed outwardly in gap 28 includes oppositely inclined ramps 25 and 26 which converge outwardly toward a notch 27 opening outwardly in gap 28 between ramps 25 and 26. The ramps 25 and 26 form a cam-like bulge 30 extending outwardly beyond a straight edge portion 29 of latch 22 which is normally substantially aligned with the bottom of groove 20. Further, in the latching position of latch 22, the free end 24a is also substantially aligned with the adjacent end of the bottom of groove 20, as is particularly evident on FIG. 4. With shutter 14 in its closed position, keeper 21a thereof is engageable in notch 27 of latch 22 in its latching position for securing shutter 14 in its closed position. In such closed position of shutter 14, end 24a of latch 22 projects slightly between shutter plates 15 and 16. However, when latching portion 24 is urged inwardly to its released position (FIG. 9) as hereinafter described, keeper 21a is released from notch 27 so that shutter 14 is then free to be moved to its opened position.

The extent of the resilient movement of latching portion 24 between its latching and released positions is desirably limited, for example, by a pin 32 extending fixedly between panel walls 1a and 1b and being received in an elongated slot 31 in latching portion 24.

At the center of the connecting portion or web 17 of shutter 14, there is provided a shallow, elongated recess 33 (FIG. 12) opening at the outer surface 17A of web 17 and having an end surface or shoulder 33a, at the end of recess 33 extending toward keeper 21a, which is engageable, as hereinafter described, for the return movement of shutter 14 from its opened position to its closed position.

Referring again to FIG. 1, it will be seen that a magnetic recording and/or reproducing apparatus intended for use with the above described disc cassette A generally comprises a cassette holder 34 for slidably receiving jacket 1 and a casing cover 35 which are angularly displaceable relative to each other about a hinge 36 which also serves to pivotally connect holder 34 and cover 35 to a base plate or main chassis 37. A turntable 38 is rotatably mounted adjacent the center of chassis 37 and is adapted to magnetically attract hub 4 of magnetic disc 2 when jacket 1 is slidably inserted into holder 34 to an operative position and holder 34 and casing cover 35 are angularly displaced or pivoted downwardly, as viewed on FIG. 1, to an operating position close to chassis 37. A magnetic head 39 for recording or reproducing signals in annular tracks on disc 2 is mounted on a magnetic head shifter 40 which is displaceable on chassis 37 for moving head 39 in the radial direction of the operatively positioned magnetic disc 2. An electric driving motor 41 is mounted under chassis 37 for rotatably driving turntable 38. Motor 41 is desirably provided with a servo control circuit (not shown) for causing disc 2 to be rotated at a constant speed and with a predetermined phase relation to signals being recorded in, or reproduced from annular tracks on the disc.

The head shifter 40 is shown to include an elongated arm 44 having the head 39 mounted thereon intermediate its ends and extending upwardly through an arcuate slot 43 in a base member 42 fixed on main chassis 37. One end of arm 44 is pivotally mounted on chassis 37, as at 46. A tension coil spring 45 is connected, as at 45a, with arm 44 for urging the latter in the direction of the arrow a on FIG. 1 which corresponds to radially inward movement of head 39 in respect to the record disc 2 of an operatively positioned cassette. A driving shaft 47 which is centered in respect to rotatable turntable 38 projects from the latter for engagement in hole 3 of disc hub 4. A pulley 48 is secured on the shaft of motor 41 and drives a belt 49 which runs around the periphery of turntable 38 for driving the latter. Also mounted on chassis 37 is a counter driving unit 51 having a counter driving shaft 50 adapted to be received in the keyhole-shaped opening 7 of index member 8 for rotatably driving the latter. Counter driving unit 51 is also adapted to drive arm 44 so that the turning of index member 8 of indicator 6 is synchronized with the radial movements of magnetic head 39 to insure that indicator 6 always indicates the annular track on disc 2 being traced by head 39 for recording or reproducing signals therein. The foregoing devices provided on chassis 37 have only been briefly described herein, as such devices form no part of the present invention which is concerned with the structure of cassette holder 34 and the devices associated therewith for positively effecting movements of shutter 14 to its opened and closed positions in response to the insertion and removal, respectively, of jacket 1 in holder 34.

More particularly, cassette holder 34 is shown to include a frame 52 which is substantially rectangular and formed to include opposite side frame portions 53 and 54 having U-shaped cross-sections opening laterally towards each other for slidably receiving and guiding side portions 1A and 1B, respectively, of jacket 1. Connecting frame portions 55 and 56 extend between opposite side frame portions 53 and 54 at the ends of the latter which are adjacent hinge 36 and remote from such hinge, respectively.

A shutter opening member 57 is associated with the side frame portion 53, that is, the side frame portion in which side 1A of jacket 1 is slidably guided. Shutter opening member 57 is in the form of an elongated channel-like structure including an upper flange 58 which rests slidably on the upper surface of side frame portion 53. One end portion 58a of the flange 58 is connected to the remainder of the latter by an inwardly angled extension 59. End portion 58a rests on connecting frame portion 55 and is formed with an elongated slot 60 receiving a pin 61 mounted on connecting frame portion 55. Shutter opening member 57 further includes a web portion 62 extending from the outer edge 58c of flange 58 and terminating, at its lower edge, in an inwardly directed lower flange 64 which extends slidably through a slot 63 extending along web 53B of side frame portion 53. Web portion 62 of shutter opening member 57 is held slidably against the outer surface of web portion 53B of side frame portion 53 by a retaining plate 66 which is held at one end, as by screws 65, to side frame portion 53 at the end of the latter near connecting frame portion 56. The opposite or free end portion of retaining plate 66 overlays and slidably engages the outer surface of web portion 62. The outer surface of side frame portion 53 is formed, adjacent connecting frame portion 55 with a step or shoulder 67 engageable by an adjacent end edge 62a of web portion 62 for limiting the movement of shutter opening member 57 relative to frame 52 in the direction of the arrow B on FIG. 6. The travel of shutter opening member 57 in the opposite direction is determined by the abutment of pin 61 against the end 60a of elongated slot 60. Preferably, the distance 1 between the end edge 62a of web portion 62 and step 67, when pin 61 engages end 60a of slot 60, is selected to be substantially the same as the distance between pin 61 and the opposite end 60b of slot 60. Thus, the permissible travel of shutter opening member 57 relative to frame 52 is the distance 1 which is preferably made smaller than the extent of the overlap of plate 66 on web portion 62 to that, member 57 cannot become disengaged from retaining plate 66 as a consequence of the movement of member 57 relative to frame 52.

In accordance with this invention a pawl assembly 68 acting as a shutter closing means is provided on side frame portion 53 adjacent connecting frame portion 56. The pawl assembly 68 is shown to include a pawl plate 69 slidable on top of frame 52 and having an end portion 69a formed with an elongated slot 70 slidably receiving a pin 71 that extends upwardly from the corner of frame 52 defined by the confluence of frame portions 53 and 56. A web portion 72 depends from the outer edge 69A of plate 69 and, at its lower edge, is bent inwardly to form a pawl tooth or nose 73 which is also directed inwardly through slot 63 in the adjacent side frame portion 53. A cam-like extension 74 is directed from plate 69 opposite to end portion 69a and is engageable with a cam follower pin 75 directed upwardly from side frame portion 53. An arm 76 is directed laterally inward from the end portion 58b of flange 58 which is remote from the previously mentioned end portion 58a. A tension coil spring 77 is connected between an end 76a of arm 76 and an arm 69b on pawl plate 69. The effect of spring 77 is to urge shutter opening member 57 longitudinally relative to frame 52 to the position shown on FIG. 6. Further, spring 77 urges pawl plate 69 both angularly and bodily to the position shown on FIG. 6 in which nose 73 is directed inwardly through slot 63.

The operations of shutter opening member 57 and of pawl assembly 68 in moving shutter 14 to its opened position and to its closed position, respectively, in response to the insertion and removal of jacket 1 to and from its operative position in frame 52 of holder 34 will now be described with reference to FIGS. 8-12. Starting with disc cassette A in its normal condition for storage, that is, with its shutter 14 locked in its closed position by the engagement of keeper 21a in notch 27 of latch 22, disc cassette A is inserted in frame 52 in the direction of the arrow B on FIG. 8 with jacket 1 being oriented so that side 1C is at the leading end of the inserted jacket and side 1A is slidable along the channel-like side frame portion 53. As soon as such insertion of jacket 1 into frame 52 has been initiated, flange 64 of shutter opening member 57 extends into gap 28 of jacket 1, as shown on FIG. 9. As jacket 1 is moved in the direction of the arrow B, end portion 64a of flange 64 engages inclined ramp 25 on latching portion 24 for urging the latter inwardly to its disengaged position in which keeper 21a on shutter 14 is released from notch 27 of latching portion 24. Immediately after release of keeper 21a from notch 27 of latching portion 24, the end edge 64A of flange 64 comes into engagement with the bent end of extension 21 defining keeper 21a. Therefore, in the course of further insertion of jacket 1 into frame 52, end edge 64A of flange 64 is effective to cause movement of shutter 14 relative to jacket 1 in the direction toward the opened position so that windows 12 and 13 of jacket 1 are gradually uncovered.

It is also to be noted that, as soon as the insertion of jacket 1 into frame 52 has progressed to the extent where the nose 73 of pawl assembly 68 is engaged by extension 21 of web portion 17 of shutter 14 in its closed position, pawl plate 69 is angularly displaced about pin 71 in the clockwise direction, thereby increasing the force of spring 77. During the opening of shutter 14, nose 73 rides on the outer surface of web portion 17 at a position thereon spaced by the distance 1 from the adjacent end 33a of recess 33, as shown on FIG. 8. Such positional relationship of the nose 73 of pawl assembly 68 to recess 33 of shutter 14 is maintained substantially constant during the movement of shutter 14 to its opened position. The opened position of shutter 14 is achieved, as shown on FIG. 10, when the insertion of jacket 1 in frame 52 has moved the leading side 1C of the jacket to within the distance 1 of the connecting portion 55 of the frame. When jacket 1 is further pushed or inserted into frame 52 to close the gap between leading side 1C and connecting frame portion 55, as on FIG. 11, shutter 14 cannot move further relative to jacket 1 by reason of the engagement of its edges 15B and 16B with end surfaces 18B of recesses 18. Therefore, movement of jacket 1 to the position shown on FIG. 11 causes the bent end 21a of extension 21 to drive the adjacent end edge 64A of flange 64 for displacing shutter opening member 57 relative to frame 52 to the extent permitted by the engagement of edges 62a and 67 and the engagement of end 60b of slot 60 with pin 61.

During such displacement of shutter opening member 57 by the keeper 21a on shutter 14, the recess 33 of the shutter moves similarly relative to the nose 73 of pawl assembly 68 with the result that nose 73 can now engage in recess 33 in back of the end 33a thereof. Thus, pawl plate 69 is angularly displaced in the counterclockwise direction, as viewed on FIG. 11, about pin 71 by the previously increased force of spring 77 to provide a snap-action engagement of pawl nose 73 in recess 33. With nose 73 thus engaged in recess 33, shutter 14 is held between end edge 64A of the flange 64 on shutter opening member 57 and nose 73 of pawl assembly 68 so as to ensure that shutter 14 is reliably held in its opened position during recording or reproducing operations.

At the completion of such recording or reproducing operations, jacket 1 is manually grasped, for example, at the end thereof remote from the side 1C, and is slidably removed from frame 52 of holder 34 in the direction of the arrow B' on FIG. 12. During such slidable removal of jacket 1 from frame 52, nose 73 of pawl assembly 68 engages end 33a of the recess 33 in of shutter 14 so that the latter is held against movement with jacket 1. Accordingly, shutter 14 is moved to its closed position relative to windows 12 and 13, as shown on FIG. 12. After shutter 14 has attained its fully closed position, as determined by the engagement of its end edges 15A and 16A with ends 18A of recesses 18, further movement of jacket 1 in the direction of the arrow B' on FIG. 12 is accompanied by a corresponding incremental movement of shutter 14, and hence of pawl nose 73 engaged therewith. In response to the incremental movement of nose 73 in the direction of the arrow B' on FIG. 12, cam-like extension 74 of pawl plate 69 rides against fixed cam follower pin 75 to turn plate 69 about pin 71 in the clockwise direction against the force of spring 77 with the result that nose 73 is withdrawn from recess 33 immediately following the return of shutter 14 to its closed position. During further removal of jacket 1 from frame 52 of holder 34, flange 64 of shutter opening member 57 is slidably removed from gap 28 with the result that flange 64 no longer acts on ramp 25 of latch 22 so as to permit resilient portion 24b thereof to return latching portion 24 to its engaged position in which keeper 21a of shutter 14 is engaged in notch 27, thereby locking shutter 14 in its closed position.

Figure 13:
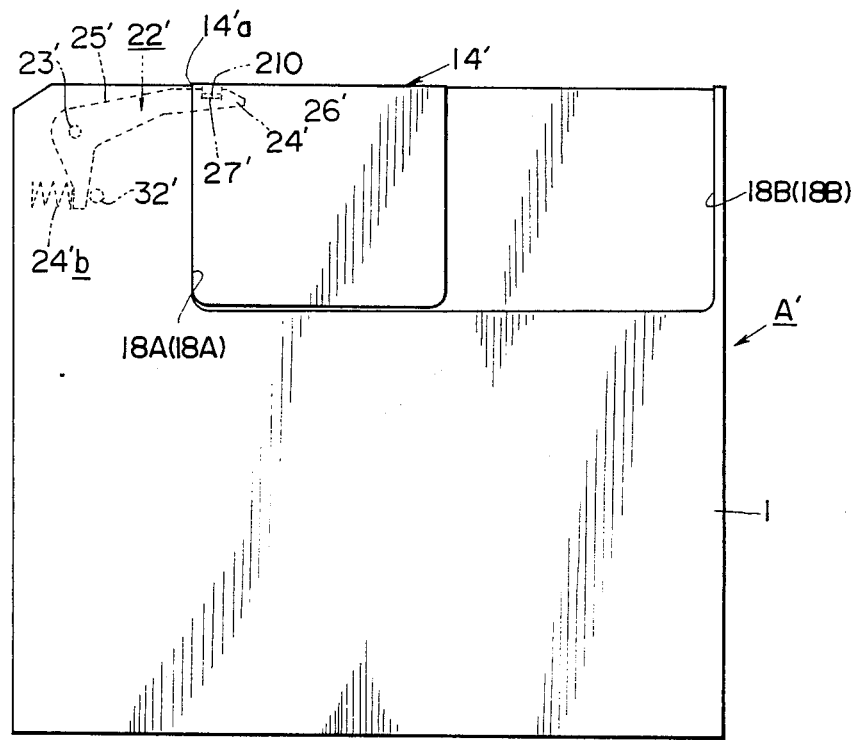
FIGS. 13A and 13B are respectively a plan view and a side elevational view similar to those of FIGS. 2 and 3, respectively, but illustrating a disc cassette according to another embodiment of this invention.
Figure 13:
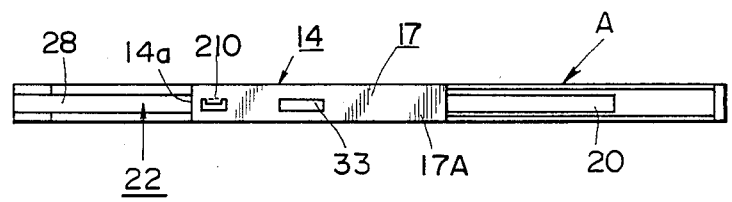

Referring now to FIGS. 13A and 13B, it will be seen that, in a disc cassette A' according to another embodiment of this invention, those parts which may be the same as parts previously described in connection with the disc cassette A are identified by the same reference numerals, and those parts which correspond to the previously described parts are identified by the same reference numerals, but with primes appended thereto. Thus, disc cassette A' is shown to include a jacket 1 rotatably containing a record disc (not shown) and having windows (not shown) which are covered by a shutter 14' in the closed position of the latter, as shown, and which are adapted to be uncovered when shutter 14' is moved slidably in respect to jacket 1 to an opened position in which ends 18B of recesses provided in the opposite sides of jacket 1 are engaged by respective edges of shutter 14. Disc cassette A' differs from the previously described cassette A according to this invention primarily in that a keeper 210 for cooperation with a latch 22' in holding shutter 14' in its closed position is struck from the web portion 17 of shutter 14'. Further, as shown, latch 22' is in the form of a latching lever 24' pivoted in gap 28 on a pivot pin 23' and having a depending arm portion acted upon by a spring 24'b so as to urge latching lever 24' to its engaged or latching position defined by a stop pin 32' and in which keeper 210 is engageable in a notch 27' of latching lever 24'.

Referring now to FIGS. 14A–14C, it will be seen that, in the cassette holder 34' of a loading device according to another embodiment of this invention particularly suited for use with the disc cassette A' of FIGS. 13A and 13B, a shutter opening member 57' is fixedly secured, as by screws 79a and 79b, to side frame portion 53. Such fixed shutter opening member 57' includes a lower flange portion 64' directed laterally inward through slot 63 and having a laterally enlarged nose portion 64'B adjacent its end edge 64'A. Thus, the laterally enlarged nose portion 64'B is directed laterally inward a greater distance through slot 63 than is the remaining inner edge portion 64'b of flange 64'.

Referring now to FIG. 15A, it will be seen that, when disc cassette A' is initially inserted into frame 52' of cassette holder 34', nose 73 of pawl assembly 68 again rides on the outer surface 17A of the connecting portion or web 17 of shutter 14' and is kept in sliding contact therewith by the force of spring 77. When jacket 1 attains the position shown in FIG. 15B relative to frame 52', nose 73 is engageable in recess 33 of shutter 14' by the action of spring 77 on pawl plate 69. Since shutter opening member 57' is fixed relative to side frame portion 53, and thus cannot effect initial loading of spring 77, as in the case of the previously described embodiment of this invention, it is desirable that the normal force of spring 77 be increased so as to achieve a snap action when nose 73 is engaged in recess 33. During such engagement of nose 73 in recess 33, the inwardly directed nose portion 64'B of shutter opening member 57' is riding on the inclined ramp 25' of latch 22' so that latch lever 24' is thereby angularly turned against the force of spring 24'b, that is, in the clockwise direction as viewed on FIG. 15B. Thus, keeper 210 of shutter 14' is disengaged from notch 27' of latch lever 24' to permit movement of shutter 14' away from its closed position. Simultaneously with the release of latch lever 24' from keeper 210, end edge 64'A of shutter opening member 57' comes into engagement with the adjacent end edge 14'a of shutter 14'. Thus, as jacket 1 of disc cassette A' is pushed further into frame 52' of holder 34', shutter 14' is moved toward its opened position relative to jacket 1 for gradually uncovering windows 12 and 13 (FIG. 16). Preferably, for reliable movement of shutter 14' to its opened position, nose 73 of pawl assembly 68 should engage in recess 33 of shutter 14' before the release of latch 22' from keeper 210. It is further to be noted that, after latch 22' has been disengaged from keeper 210 on shutter 14' and the movement of the latter toward its opened position has been commenced, latch 22' moves away from the inwardly directed nose 64'B of shutter opening member 57' so that latch 22' can return to its spring urged position against stop pin 32' for removing any increased load from spring 24'b.

When disc cassette A' is removed from holder 34' by sliding its jacket 1 relative to frame 52' in the direction of the arrow B' on FIG. 17, the engagement of nose 73 of pawl assembly 68 in recess 33 of shutter 14' holds the latter against movement with jacket 1, and hence moves the shutter toward its closed position relative to the jacket. As shutter 14' nears its closed position, jacket 1 is positioned relative to frame 52' so that nose 64'B of shutter opening member 57' acts against ramp 26' and then ramp 25' of latch 22' for urging the latter to its released position. As jacket 1 is further removed beyond the position where shutter 14' first attains its closed position, nose 64'B of member 57' is separated from ramp 25' so that spring 24'b can angularly return latch 22' to its engaged position in which keeper 210 on shutter 14' is received in notch 27' for locking the shutter in its closed position (FIG. 18A).

As the withdrawl of jacket 1 in the direction of the arrow B' continues beyond the position in which shutter 14' is returned to its closed position, the movement of shutter 14' with jacket 1 is effective to bodily displace pawl plate 69 with the result that cam-like extension 74 of pawl plate 69 rides on fixed pin 75 to angularly displace pawl plate 69 about pin 71 (FIG. 18B) and thereby release nose 73 from the recess 33 in shutter 14'. Nose 73 then rides on the surface of shutter 14' until the removal of jacket 1 has progressed further to the point where nose 73 rides off the end edge 14'a of the shutter for permitting spring 77 to return pawl plate 69 to the position shown on FIG. 14A.

It will be appreciated from the foregoing that, when the disc cassette A or A' is inserted into the cassette holder 34 or 34' according to this invention, the latch 22 or 22' normally holding the shutter 14 or 14' in its closed position is released automatically and the shutter 14 or 14' is moved to its opened position in response to the insertion of the jacket 1 into the frame 52 or 52'. Conversely, when the disc cassette A or A' is removed from cassette holder 34 or 34', the shutter 14 or 14' is automatically and positively moved to its closed position and latch 22 or 22' is again engaged for locking the shutter in such closed position. Thus, even though the disc cassette A or A' is not provided with a spring for urging the shutter to its closed position when the cassette is apart from the recording and/or reproducing apparatus, the present invention insures that the shutter will be positively moved to its closed position and there locked as a consequence of the removal of the cassette from the recording and/or reproducing apparatus. It is also to be noted that the foregoing operations characteristic of the present invention can also be achieved even if the cassette is provided with a supplemental spring (not shown) for urging the shutter 14 or 14' toward its closed position.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a recording and/or reproducing apparatus including a main chassis having a rotary spindle and a signal transducer mounted thereon and being intended for use with a disc cassette including a generally rectangular jacket containing a record disc and having spaced-apart panel walls between which the disc is rotatable, said panel walls having openings adjacent one of the sides of said rectangular jacket to define a window through which the disc is adapted to be exposed, and a peripheral wall extending between said panel walls with a gap therein adjacent an end portion of said one side of the jacket and with a groove in said peripheral wall extending from said gap along said one side of the jacket, a shutter movable on the jacket parallel to said one side between opened and closed positions in respect to the window, means preventing movements of said shutter relative to said jacket beyond said opened and closed positions, said shutter including spaced plates and a connecting portion therebetween to straddle said jacket with a keeper extending inwardly from said connecting portion and being movable along said groove and into said gap with movement of said shutter to said closed position relative to said window, and a latch for locking the shutter in its closed position and being disposed in said gap and yieldably urged outwardly in the gap to engage with said keeper with said shutter is in said closed position:

a loading device for positioning the disc cassette on the recording and/or reproducing apparatus comprising:

a cassette holder mounted on said main chassis and having first and second substantially parallel side portions slidably receiving said one side and the opposite side, respectively, of said jacket for insertion and removal movements of the jacket in directions parallel with said one side to and from an operative position of the disc cassette in said holder and in which said record disc is engageable by said spindle and transducer;

a projection extending from said first said portion of the cassette holder and being operative, in response to said insertion movement of the jacket into said cassette holder to enter said gap and act inwardly on said latch for releasing the latter from said keeper and than to enter said groove and act against said connecting portion of the shutter for moving said shutter to said opened position relative to said window; and pawl means at said first side portion of the cassette holder and being engageable with said shutter for moving the latter to said closed position in response to said removal movement of said jacket from said operative position in the cassette holder, said pawl means including a pawl member movably mounted on said cassette holder for movement between engaged and disengaged positions relative to said shutter of the disc cassette having its jacket slidable in said side portions, spring means urging said pawl member to said engaged position thereof, and release means operative to move said pawl member to said disengaged position in response to said removal movement of said jacket from the cassette holder continuing after the shutter has been moved to said closed position.

2. A recording and/or reproducing apparatus according to claim 1; in which said cassette holder is hinged on said main chassis so that, with said jacket in said operative position in said cassette holder, angular displacement of said cassette holder is effective to move said record disc into and out of engagement with said spindle and transducer.

3. A recording and/or reproducing apparatus according to claim 1; in which said shutter has a recess; and in which said pawl member is mounted on said cassette holder for angular displacements between said engaged and disengaged positions and for bodily movements relative to said cassette holder parallel to said insertion and removal movements between first and second limited positions, said spring means also urges said pawl member to move bodily in the direction of said insertion movement to said first limited position, said pawl member has a nose seating in said recess in said engaged position for moving the shutter to said closed position prior to completion of said removal movement of the jacket from said cassette holder and for thereafter bodily moving said pawl member toward said second limited position against the force of said spring means in response to said continuing removal movement, and said release means effects angular displacement of said pawl member to said disengaged position in response to the bodily movement of the pawl member to said second limited position against the force of said spring means.

4. A recording and/or reproducing apparatus according to claim 3; in which said pawl member and cassette holder have a pin-and-slot connection therebetween for permitting said angular displacements and bodily movements, and said release means includes a cam surface and a cam follower on said pawl member and said cassette holder, respectively.

5. In a recording and/or reproducing apparatus including a main chassis having a rotary spindle and a signal transducer mounted thereon and being intended in a snap-action manner for use with a disc cassette including a generally rectangular jacket containing a record disc and having spaced-apart panel walls between which the disc is rotatable, said panel walls having openings adjacent one of the sides of said rectangular jacket to define a window through which the disc is adapted to be exposed, and a peripheral wall extending between said panel walls with a gap therein adjacent an end portion of said one side of the jacket and with a groove in said peripheral wall extending from said gap along said one side of the jacket, a shutter movable on the jacket parallel to said one side between opened and closed positions in respect to the window, means preventing movements of said shutter relative to said jacket beyond said opened and closed position, said shutter including spaced plates and a connecting portion therebetween to straddle said jacket with a keeper extending inwardly from said connecting portion and being movable along said groove and into said gap with movement of said shutter to said closed position relative to said window, and a latch for locking the shutter in its closed position and being disposed in said gap and yieldably urged outwardly in the gap to engage with said keeper when said shutter is in said closed position:

a loading device for positioning the disc cassette on the recording and/or reproducing apparatus comprising:

a cassette holder mounted on said main chassis and having first and second substantially parallel side portions slidably receiving said one side and the opposite side, respectively, of said jacket for insertion and removal movements of the jacket in directions parallel with said one side to and from an operative position of the disc cassette in said holder and in which said record disc is engageable by said spindle and transducer;

a projection extending from said first side portion of the cassette holder and being operative, in response to said insertion movement of the jacket into said cassette holder to enter said gap and act inwardly on said latch for releasing the latter from said keeper and than to enter said groove and act against said connecting portion of the shutter for moving said shutter to said opened position relative to said window;

said projection being mounted on said cassette holder for bodily movements relative to said cassette holder in the directions of said insertion and removal movements between first and second limited positions, spring means urging said projection to move bodily in said direction of the removal movement to said first limited position, said projection, at the spring-urged first limited position of its bodily movement, effecting movement of said shutter to said opened position prior to the arrival of said jacket at said operative position so that said projection is displaced relative to said cassette holder toward said second limited position thereof against the force of said spring means during continued movement of said jacket to said operative position; and pawl means at said first side portion of the cassette holder and being engageable with said shutter only upon said continued movement of the jacket to said operative position for thereafter moving the shutter to said closed position in response to said removal movement of said jacket from said cassette holder.

6. A recording and/or reproducing apparatus according to claim 5; in which said pawl means includes a pawl member movably mounted on said cassette holder for movement between engaged and disengaged positions relative to said shutter of the disc cassette having its jacket slidable in said side portions, said spring means being connected between said projection and said pawl member for also urging said pawl member to said engaged position thereof, and release means operative to move said pawl member to said disengaged position in response to said removal movement of said jacket from the cassette holder continuing after the shutter has been moved to said closed position thereof.

7. A recording and/or reproducing apparatus according to claim 6; in which said shutter has a recess; and in which said pawl member is mounted on said cassette holder for angular displacements between said engaged and disengaged positions and for bodily movements relative to said cassette holder parallel to said insertion and removal movements between first and second limited positions, said spring means also urges said pawl member to move bodily in the direction of said insertion movement to said first limited position of said pawl member, said pawl member has a nose seating in said recess in said engaged position for moving the shutter to said closed position prior to completion of said removal movement of the jacket from said cassette holder and for thereafter bodily moving said pawl member toward said second limited position thereof against the force of said spring means in response to said continuing removal movement, and said release means effects angular displacement of said pawl member to said disengaged position in response to the bodily movement of the pawl member to said second limited position thereof against the force of said spring means.

8. A recording and/or reproducing apparatus according to claim 7; in which said shutter has a distance therealong between a point of engagement thereof with said projection and said recess which is greater than a distance between said projection and said nose of the pawl member when said projection and pawl member are spring-urged to their respective first limited positions so that said pawl member is movable by said spring means to its engaged position with said nose seating in said recess of the shutter only when said projection is displaced toward said second limited position of the latter during said continued movement of the jacket to said operative position.

9. A recording and/or reproducing apparatus according to claim 8; in which said pawl member and cassette holder have a pin-and-slot connection therebetween for permitting said angular displacements and bodily movements, and said release means includes a cam surface and a cam follower on said pawl member and said cassette holder, respectively.

10. In a recording and/or reproducing apparatus including a main chassis having a rotary spindle and a signal transducer mounted thereon: the combination of a disc cassette including a generally rectangular jacket containing a record disc and having spaced-apart panel walls between which the disc is rotatable, said panel walls having openings adjacent one of the sides of said rectangular jacket to define a window through which the disc is adapted to be exposed, and a peripheral wall extending between said panel walls with a gap therein adjacent an end portion of said one side of the jacket and with a groove in said peripheral wall extending from said gap along said one side of the jacket, a shutter movable on the jacket parallel to said one side between opened and closed positions in respect to the window, means preventing movements of said shutter relative to said jacket beyond said opened and closed positions, said shutter including spaced plates and a connecting portion therebetween to straddle said jacket with a keeper extending inwardly from said connecting portion and being movable along said groove and into said gap with movement of said shutter to said closed position relative to said window, and a latch for locking the shutter in its closed position and being disposed in said gap and yieldably urged outwardly in the gap to engage with said keeper when said shutter is in said closed position; and a loading device for positioning said disc cassette on the recording and/or reproducing apparatus comprising a cassette holder mounted on said main chassis and having first and second substantially parallel side portions slidably receiving said one side and the opposite side, respectively, of said jacket for insertion and removal movements of the jacket in directions parallel with said one side and from an operative position of the disc cassette in said holder and in which said record disc is engageable by said spindle and transducer, a projection extending from said first side portion of the cassette holder and being operative, in response to said insertion movement of said jacket into said cassette holder, to enter said gap and act inwardly on said latch for releasing the latter from said keeper and than to enter said groove and act against said connecting portion of the shutter for moving said shutter to said opened position relative to said window, and pawl means at said first side portion of the cassette holder and being engageable with said shutter for moving the latter to said closed position in response to said removal movement of said jacket from said cassette holder, said pawl means including a pawl member movably mounted on said cassette holder for movement between engaged and disengaged positions relative to said shutter of the disc cassette having its jacket slidable in said side portions, spring means urging said pawl member to said engaged position thereof, and release means operative to move said pawl member to said disengaged position in response to said removal movement of said jacket from the cassette holder continuing after the shutter has been moved to said closed position thereof.

11. A recording and/or reproducing apparatus according to claim 10; in which said cassette holder is hinged on said main chassis so that, with said jacket in said operative position in said cassette holder, angular displacement of said cassette holder is effective to move said record disc into and out of engagement with said spindle and transducer.

12. A recording and/or reproducing apparatus according to claim 10; in which said shutter has a recess; and in which said pawl member is mounted on said cassette holder for angular displacements between said engaged and disengaged positions and for bodily movements relative to said cassette holder parallel to said insertion and removal movements between first and second limited positions, said spring means also urges said pawl member to move bodily in the direction of said insertion movement to said first limited position of said pawl member, said pawl member has a nose seating in said recess in said engaged position for moving the shutter to said closed position prior to completion of said removal movement of the jacket from said cassette holder and for thereafter bodily moving said pawl member against the force of said spring means in response to said continuing removal movement, and said spring release means effects angular displacements of said pawl member to said disengaged position in response to the bodily movement of the pawl member to said second limited position thereof against the force of said spring means.

13. In a recording and/or reproducing apparatus including a main chassis having a rotary spindle and a signal transducer mounted thereon: the combination of a disc cassette including a jacket containing a record disc, said jacket being generally rectangular and including two opposed, spaced-apart panel walls between which said record disc is rotatable, said panel walls having openings adjacent one of the sides of said rectangular jacket to define a window through which the disc is adapted to be exposed, and a peripheral wall extending between said panel walls with a gap therein adjacent an end portion of said one side of the jacket and with a groove in said peripheral wall extending from said gap along said one side of the jacket, a shutter movable on the jacket parallel to said one side between opened and closed positions in respect to the window, means preventing movements of said shutter relative to said jacket beyond said opened and closed positions, said shutter including spaced plates and a connecting portion therebetween to straddle said jacket with a keeper extending inwardly from said connecting portion and being movable along said groove and into said gap with movement of said shutter to said closed position relative to said window, and a latch for locking the shutter in its closed position and being disposed in said gap between the panel walls and yieldably urged outwardly in the gap to engage with said keeper when said shutter is in said closed position; and a loading device for positioning said disc cassette on the recording and/or reproducing apparatus comprising a cassette holder mounted on said main chassis and having first and second substantially parallel side portions slidably receiving one side and the opposite side, respectively, of said jacket for insertion and removal movements of the jacket in directions parallel with said one side to and from an operative position of the disc cassette in said holder and in which said record disc is engageable by said spindle and transducer, a projection extending from said first side portion of the cassette holder and being operative, in response to said insertion movement of said jacket into said cassette holder, to enter said gap for inwardly displacing said latch in said gap so as to disengage said latch from said keeper and and then to move along said groove for displacing said shutter along said one side of the jacket so as to expose said openings in response to said slidable insertion of the jacket in said holder, pawl means at said first side portion of the cassette holder and being engageable with said shutter for moving the latter to said closed position in response to said removal movement of said jacket from said cassette holder, and release means for disengaging said pawl means from said shutter in response to continued removal movement of said jacket from said cassette holder after movement of said shutter to said closed position has been completed.

14. A recording and/or reproducing apparatus according to claim 13; in which said connecting portion of the shutter has a recess therein, and said pawl means is engageable with said shutter at said recess.

15. A recording and/or reproducing apparatus according to claim 14; in which said pawl means includes a pawl member movably mounted on said cassette holder for movement between engaged and disengaged positions relative to said recess of the shutter of the disc cassette having its jacket slidable in said side portions, and spring means urging said pawl member to said engaged position thereof; and in which said release means is operative to move said pawl member to said disengaged position in response to said continued removal movement of said jacket from the cassette holder after said movement of the shutter to its closed position has been completed.

16. A recording and/or reproducing apparatus according to claim 15; in which said pawl member is mounted on said cassette holder for angular displacements between said engaged and disengaged positions and for bodily movements relative to said cassette holder parallel to said insertion and removal movements between first and second limited positions, said spring means also urges said pawl member to move bodily in the direction of said insertion movement to said first limited position, said pawl member is located so that, with said nose seating in said recess in said engaged position, said pawl member moves said shutter to said closed position prior to complete removal of the jacket from said cassette holder and thereafter effects bodily movement of said pawl member toward said second limited position of the latter against the force of said spring means, and said release means effects angular displacement of said pawl member to said disengaged position in response to said bodily movement of the pawl member toward said second limited position of the latter against the force of said spring means.

17. A recording and/or reproducing apparatus according to claim 13; in which said latch has a base portion fixed to said jacket, a latching portion engageable with said keeper and a resiliently yieldable portion integral with said base and latching portions for permitting inward displacement of said latching portion in said gap by said projection against the resistance of said yieldable portion.

18. A recording and/or reproducing apparatus according to claim 13; in which said latch has a notch opening outwardly in said gap, and oppositely inclined ramps converging toward the opening of said notch so that said projection rides on one of said ramps for said inward displacement of the latch in response to said slidable insertion of the jacket in said holder; and in which said keeper is directed inwardly from said connecting portion of the shutter for engaging in said notch.

19. A recording and/or reproducing apparatus according to claim 18; in which said latch is pivotally mounted in said jacket and a spring angularly biases said latch to effect the yieldable outward urging thereof.

20. A recording and/or reproducing apparatus according to claim 18; in which said projection is of limited extent in the direction along said one side portion of the holder so as to move out of engagement with said ramps and permit return of said latch from said inward displacement as said projection moves said shutter to its opened position.

21. A recording and/or reproducing apparatus according to claim 1; in which said projection is fixed relative to said cassette holder at least in the directions of said insertion and removal movements of the jacket therein.

* * * * *